United States Patent
Zhang et al.

(10) Patent No.: US 7,409,097 B2
(45) Date of Patent: Aug. 5, 2008

(54) VIDEO ENCODING USING VARIABLE BIT RATES

(75) Inventors: Dengzhi Zhang, San Jose, CA (US); Sho Long Chen, Saratoga, CA (US); Stanley H. Siu, Sunnyvale, CA (US)

(73) Assignee: VWEB Corporation, Cupertino, CA (US)

( * ) Notice: Subject to any disclaimer, the term of this patent is extended or adjusted under 35 U.S.C. 154(b) by 708 days.

(21) Appl. No.: 10/714,501

(22) Filed: Nov. 14, 2003

(65) Prior Publication Data

US 2005/0105815 A1    May 19, 2005

(51) Int. Cl.
- G06K 9/36 (2006.01)
- G06K 9/38 (2006.01)
- G06K 9/46 (2006.01)
- H04N 7/12 (2006.01)
- H04N 11/02 (2006.01)
- H04N 11/04 (2006.01)
- H04J 3/16 (2006.01)
- H04J 3/22 (2006.01)
- H04B 1/66 (2006.01)

(52) U.S. Cl. .............. 382/239; 382/238; 382/251; 348/385.1; 348/407.1; 370/465; 375/240.03

(58) Field of Classification Search .............. 382/236, 382/238–239, 251; 375/240.01–240.04; 370/464–465; 348/384.1, 385.1, 390.1, 403.1, 348/404.1, 407.1
See application file for complete search history.

(56) References Cited

U.S. PATENT DOCUMENTS

| | | | | |
|---|---|---|---|---|
| 5,265,180 | A * | 11/1993 | Golin | 382/236 |
| 5,682,204 | A * | 10/1997 | Uz et al. | 375/240.15 |
| 5,832,125 | A * | 11/1998 | Reese et al. | 382/239 |
| 6,111,991 | A * | 8/2000 | Ribas-Corbera et al. | 382/251 |
| 6,493,388 | B1 * | 12/2002 | Wang | 375/240.12 |
| 6,731,685 | B1 * | 5/2004 | Liu et al. | 375/240.14 |
| 6,763,138 | B1 * | 7/2004 | Yokoyama | 382/236 |
| 2004/0179596 | A1 * | 9/2004 | Song et al. | 375/240.03 |
| 2004/0230425 | A1 * | 11/2004 | Yu et al. | 704/223 |
| 2004/0234142 | A1 * | 11/2004 | Chang et al. | 382/236 |
| 2006/0062293 | A1 * | 3/2006 | Kaye et al. | 375/240.03 |
| 2006/0088099 | A1 * | 4/2006 | Gao et al. | 375/240.16 |

* cited by examiner

*Primary Examiner*—Samir Anwar Ahmed
*Assistant Examiner*—Nathan Bloom
(74) *Attorney, Agent, or Firm*—Silicon Valley Patent Group; Edward S. Mao

(57) ABSTRACT

A system and method is provided for variable bit rate encoding using a complexity ratio. Quantization parameter is calculated using a complexity ratio, which is equal to a local complexity divided by a global complexity. Complex pictures are allocated a larger bit budget relative to simple pictures. With the larger bit budget the quality of complex pictures can be maintained while reducing the overall size of the encoded video stream.

21 Claims, 9 Drawing Sheets

VIDEO ENCODING USING VARIABLE BIT RATES

BACKGROUND OF THE INVENTION

1. Field of the Invention

The present invention relates to digital video encoding. More specifically, the present invention relates to methods of video encoding using variable bit rate to improve the video quality of an encoded video stream.

2. Discussion of Related Art

Due to the advancement of semiconductor processing technology, integrated circuits (ICs) have greatly increased in functionality and complexity. With increasing processing and memory capabilities, many formerly analog tasks are being performed digitally. For example, images, audio and even full motion video can now be produced, distributed, and used in digital formats.

FIG. 1(a) is an illustrative diagram of a digital video stream 100. Digital video stream 100 comprises a series of individual digital images 100_0 to 100_N, each digital image of a video stream is often called a frame. For full motion video a video frame rate of 30 images per second is desired. As illustrated in FIG. 1(b), a digital image 100_Z comprises a plurality of picture elements (pixels). Specifically, digital image 100_Z comprises Y rows of X pixels. For clarity, pixels in a digital image are identified using a 2-dimensional coordinate system. As shown in FIG. 1(b), pixel P(0,0) is in the top left corner of digital image 100_Z. Pixel P(X-1,0) is in the top right corner of digital image 100_Z. Pixel P(0,Y-1) is in the bottom left corner and pixel P(X-1,Y-1) is in the bottom right corner. Typical image sizes for digital video streams include 720×480, 640×480, 320×240 and 160×120.

FIG. 2 shows a typical digital video system 200, which includes a video capture device 210, a video encoder 220, a video channel 225, a video decoder 230, a video display 240, and an optional video storage system 250. Video capture device 210, typically a video camera, provides a video stream to video encoder 220. Video encoder 220 digitizes and encodes the video stream and sends the encoded digital video stream over channel 225 to video decoder 230. Video decoder 230 decodes the encoded video stream from channel 225 and displays the video images on video display 240. Channel 225 could be for example, a local area network, the internet, telephone lines with modems, or any other communication connections. Video decoder 230 could also receive a video data stream from video storage system 250. Video storage system 250 can be for example, a video compact disk system, a hard disk storing video data, or a digital video disk system. The video stream from video storage system 250 could have been previously generated using a video capture device and a video encoder. However, some video streams may be artificially generated using computer systems.

A major problem with digital video system 200 is that channel 225 is typically limited in bandwidth. As explained above a full-motion digital video stream can comprise 30 images a second. Using an image size of 640×480, a full motion video stream would have 18.4 million pixels per second. In a full color video stream each pixel comprises three bytes of color data. Thus, a full motion video stream would require a transfer rate in excess of 52 megabytes a second over channel 225. For internet application most users can only support a bandwidth of approximately 56 Kilobits per second. Thus, to facilitate digital video over computer networks, such as the internet, digital video streams must be compressed.

Most video compression algorithms, such as MPEG2 and MPEG4, reduce the bandwidth requirement of a digital video stream by not sending redundant information across channel 225. For example, as shown in FIG. 3, a digital video stream includes digital image 301 and 302. Digital image 301 includes a video object 310_1 and video object 340_1 on a blank background. Digital image 302 includes a video object 310_2, which is the same as video object 310_1, and a video object 340_2, which is the same as video object 340_1. Rather then sending data for all the pixels of digital image 301 and digital image 302, a digital video stream could be encoded to simply send the information that video object 310_1 from digital image 301 has moved three pixels to the left and two pixels down and that video object 340_1 from digital image 301 has moved one pixel down and four pixels to the left. Thus rather than sending all the pixels of image 302 across channel 225, video encoder 220 can send digital image 301 and the movement information, usually encoded as a two dimensional motion vector, regarding the objects in digital image 301 to video decoder 230. Video decoder 230 can then generate digital image 302 using digital image 301 and the motion vectors supplied by video encoder 220. Similarly, additional digital images in the digital video stream containing digital images 301 and 302 can be generated from additional motion vectors.

However, most full motion video streams do not contain simple objects such as video objects 310_1 and 340_1. Object recognition in real life images is a very complicated and time-consuming process. Thus, motion vectors based on video objects are not really suitable for encoding digital video data streams. However, it is possible to use motion vector encoding with artificial video objects. Rather than finding distinct objects in a digital image, the digital image is divided into a plurality of macroblocks. A macroblock is a number of adjacent pixels with a predetermined shape and size. Typically, a rectangular shape is used so that a rectangular digital image can be divided into an integer number of macroblocks. FIG. 4 illustrates a digital image 410 that is divided into a plurality of square macroblocks. For clarity, macroblocks are identified using a 2-dimensional coordinate system. As shown in FIG. 4, macroblock MB(0,0) is in the top left corner of digital image 410. Macroblock MB(X-1,0) is in the top right corner of digital image 410. Macroblock MB(0,Y-1) is in the bottom left corner and macroblock MB(X-1,Y-1) is in the bottom right corner. Calculations of motion vectors is well known in the art and not an integral part of the present invention. Congratulation.

In general frames produced using motion estimation using only preceding frames are called Predicted Frames (P Frames). Frames produced using motion estimation using both preceding and succeeding frames are called bi-directional (B Frames). Frames that do not use information from preceding or succeeding frames are called Intra frames (I Frames). In terms of data size, intra frames require more data than predicted frames, which require more data than bi-directional frames. However, the quality of each succeeding image calculated using motion estimation degrades. Thus, an encoded video stream are typically arranged as multiple groups of pictures (GOPs). Each group of pictures can be decoded without reference to another group of picture. Thus each group of pictures starts with an intra frames and may include additional intra frames spaced periodically throughout the group of pictures to maintain picture quality.

FIG. 6 is a simplified block diagram of a typical video encoder 600. Video encoder 600 includes a motion estimation unit 610, a discrete cosine transformation unit 620, quantizer 630, and a run-length coder 640. Motion estimation unit 610 performs motion estimation on in input video stream I_VS to generate predicted frames and bi-directional frames. Motion estimation unit 610 typically includes an embedded decoder to insure that the encoding can be properly decoded. Discrete cosine transformation unit 620 transform each frame into the frequency domain which provides more efficient data storage for video streams. Quantizer 630 reduces the magnitude of the transform coefficients of each frame to reduce the amount a data required for each frame. The quantization step is a "lossy" operation in that the original frame information can not be reproduced from the quantized transform coefficients. The amount of quantization can be controlled by adjusting a frame quantization parameter F_MQUANT. The quantized coefficients are then run-length encoded to form an encoded video stream E_VS. The size and therefore the bit rate of encoded video stream E_VS can be controlled using frame quantization parameter F_MQUANT.

As explained above video compression is generally needed because channel 225 (FIG. 2) has limited bandwidth. Thus some video encoders use a constant bit rate (CBR) scheme so that the encoded video stream can be transferred across channel 225. However, constant bit rate compression generally causes varying picture quality especially when comparing a complex picture with a simple picture or during scene changes, which would not have the benefits of motion estimation. Another approach is to use a variable bit rate and buffering to fully utilize channel 225. The average of the variable bit rate over time must be close to a target bit rate that channel 225 can handle. Using variable bit rate, more bits that are not necessary for simple pictures to achieve a desired picture quality can be saved for use on complex pictures. Thus, in theory the overall picture quality of the encoded video stream can be improved using variable bit rate encoding. However, allocating the bits to each frame to achieve the desired picture quality level can be very complex. Hence there is a need for a method or system to control the frame quantization parameter to allocate bits to the frames of a video stream to achieve high picture quality.

SUMMARY

Accordingly, the present invention provides a method and system for encoding a digital video stream providing higher picture quality without increasing computational overhead. Specifically, the present invention allocates and uses more bits to encode complex pictures than for simple pictures. By increasing the number of bits used to encode complex pictures, the quality of the complex pictures are improved. Because simple pictures are less complex, the reduction in the number of bits used for encoding the simple pictures does not result is perceivable loss of picture quality. The number of bits used to encode a frame is related to a frame quantization parameter, which controls the quantization of the frame. The present invention uses the complexity of the frame to determine the frame quantization parameter.

In accordance with one embodiment of the present invention, a frame complexity calculation unit calculates a complexity ratio for the current frame. The complexity ratio is equal to a local complexity divided by a global complexity. A current frame bit rate calculation unit uses the complexity ratio to calculate a current frame bit rate, which limits the number of bits used to encode the current frame. A current frame MQUANT calculation unit calculates the frame quantization parameter from the current frame bit rate.

Some embodiments of the present invention also include a bit balance adjustment unit, which calculates a bit balance adjustment values for the current frame bit rate calculation unit. The bit balance adjustment factor is indicative of the number of bits available or the number of bits that need to be saved due to the encoding of previous frames. Furthermore, some embodiments of the present invention include a frame coding efficiency calculation unit, which calculates a frame coding efficiency factor for current frame MQUANT calculation unit. The frame coding efficiency factor is dependent on the frame type of the current frame is used to tailor the frame quantization parameter for the frame type.

The present invention will be fully understood in view of the following description and drawings.

DETAILED DESCRIPTION

As explained above, video encoders using variable bit rate can produce an encoded video stream with higher overall picture quality than using constant bit rate. However, to achieve the higher picture quality the available bits must be allocated to the frames in an intelligent manner. Depending on the channel and decoder to be used with the encoded video stream, certain constraints on the variable bit rate are present. Specifically, a burst bit rate BURST_RATE is the maximum bit rate that the channel can accept data and a target bit rate TARGET_RATE is the rate that the average variable bit rate should equal. For convenience these bit rates are converted to a per frame bit rate. Specifically, a frame burst bit rate F_BURST_RATE is equal to the burst bit rate BURST_RATE divided by a frame rate F_RATE of the video stream (i.e. F_BURST_RATE=BURST_RATE/F_RATE). Similarly, a frame target bit rate F_T_RATE is equal to the target bit rate TARGET_RATE divided by frame rate F_RATE of the video stream (i.e. F_T_RATE=TARGET_RATE/F_RATE).

Another consideration is that encoded video stream E_VS is to be decoded by a video decoder. The video decoder uses a video buffer of limited size. While encoding encoded video stream E_VS, the video encoder must insure that the video buffer of the decoder will not overflow or underflow during decoding. Therefore, most embodiments of a video encoder includes a video buffer verifier which simulates the video buffer of a decoder that would be used to decode encoded video stream E_VS. Video buffer verifiers are well known in the art and not an integral part of the present invention.

The video encoder can also be configured with operational parameters for better control of the compression. For example, some embodiment of the present invention configures the video encoder with a frame maximum bit rate F_MAX_RATE and a frame minimum bit rate F_MIN_RATE. Frame maximum bit rate F_MAX_RATE, which should be less than or equal to frame burst rate F_BUR- ST_RATE, is the maximum number of bits the encoder will use on a particular frame. The number of bits used in a frame should be capped so that enough bits remain for later frames. Frame minimum bit rate F_MIN_RATE is the minimum number of bits the encoder should use on a particular frame. Frame minimum bit rate F_MIN_RATE prevents the quality of a frame from being too low. However, for some very simple frames, which require very few bits for encoding, frame minimum bit rate F_MIN_RATE can be ignored. In one embodiment of the present invention, frame maximum bit rate F_MAX_RATE is equal to the lesser of frame burst bit rate F_BURST_RATE or three times frame target bit rate F_T_RATE, and frame minimum bit rate F_MIN_RATE is equal to frame target rate F_T_RATE divided by 2.

Figure 1A:
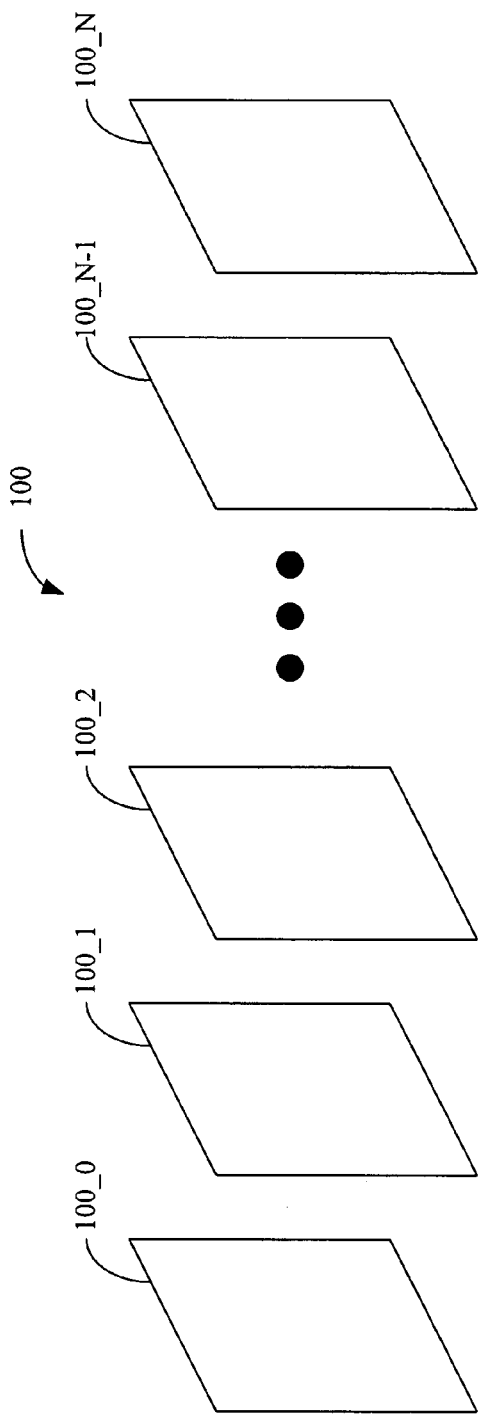
FIG. 1(a) is an illustration of a digital video stream of digital images.
Figure 1B:
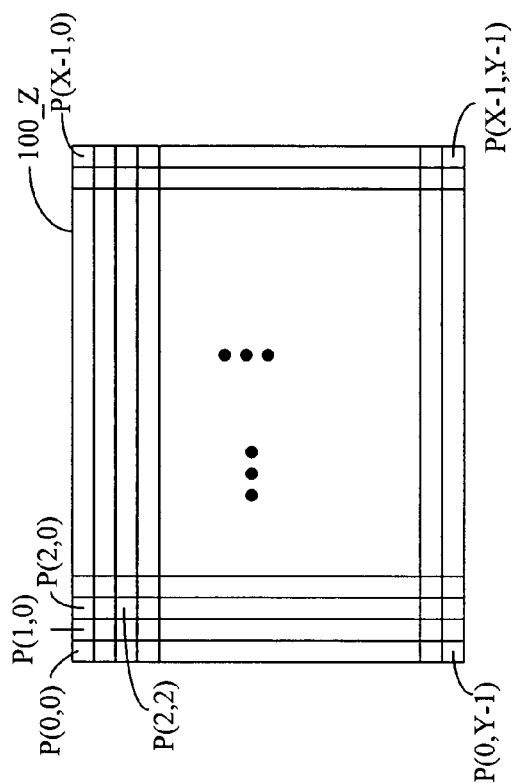
FIG. 1(b) is a diagram of a digital image comprising picture elements (pixels).
Figure 2:
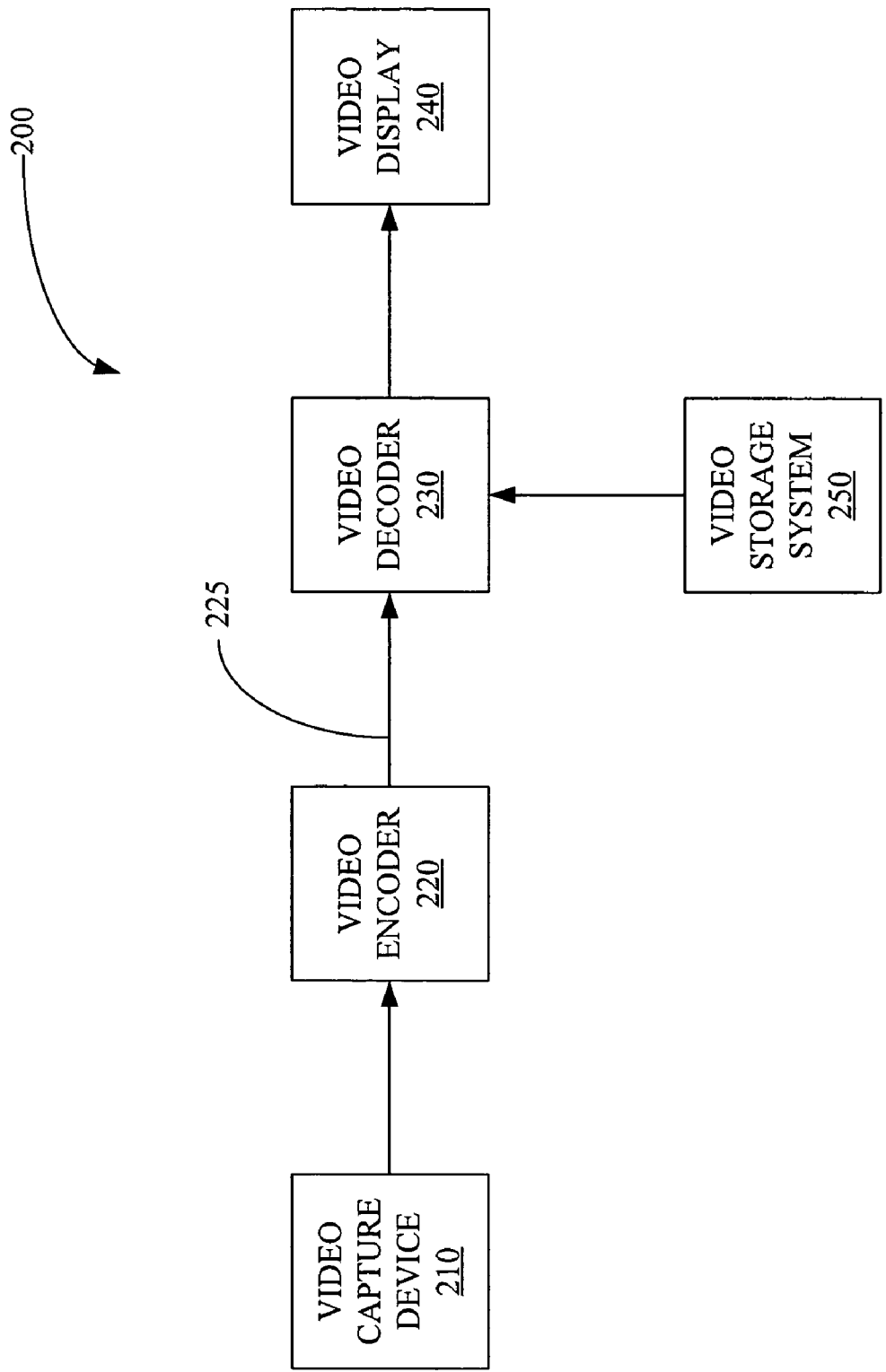
FIG. 2 is a block diagram of a digital video system.
Figure 3:
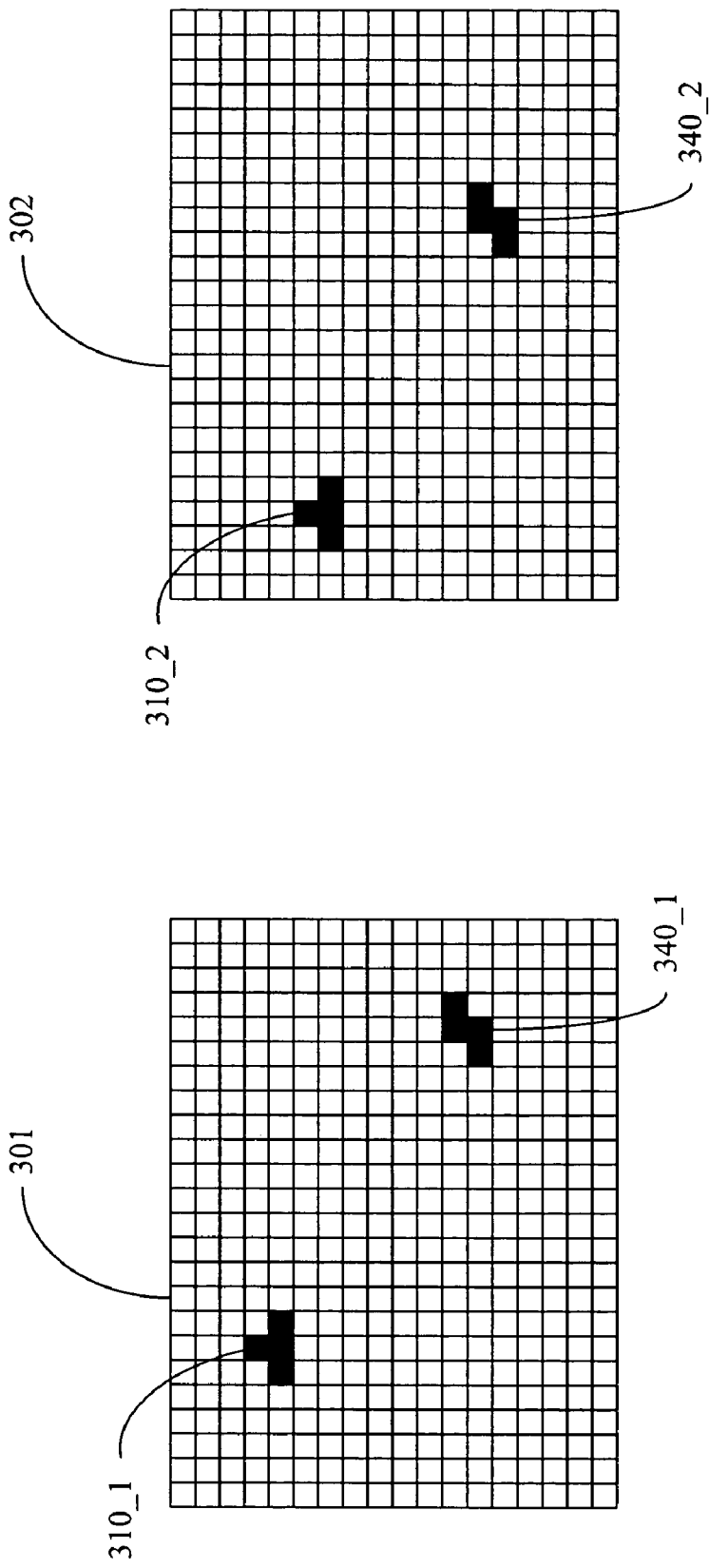
FIG. 3 is an illustration of object encoding of a digital video stream.
Figure 4:
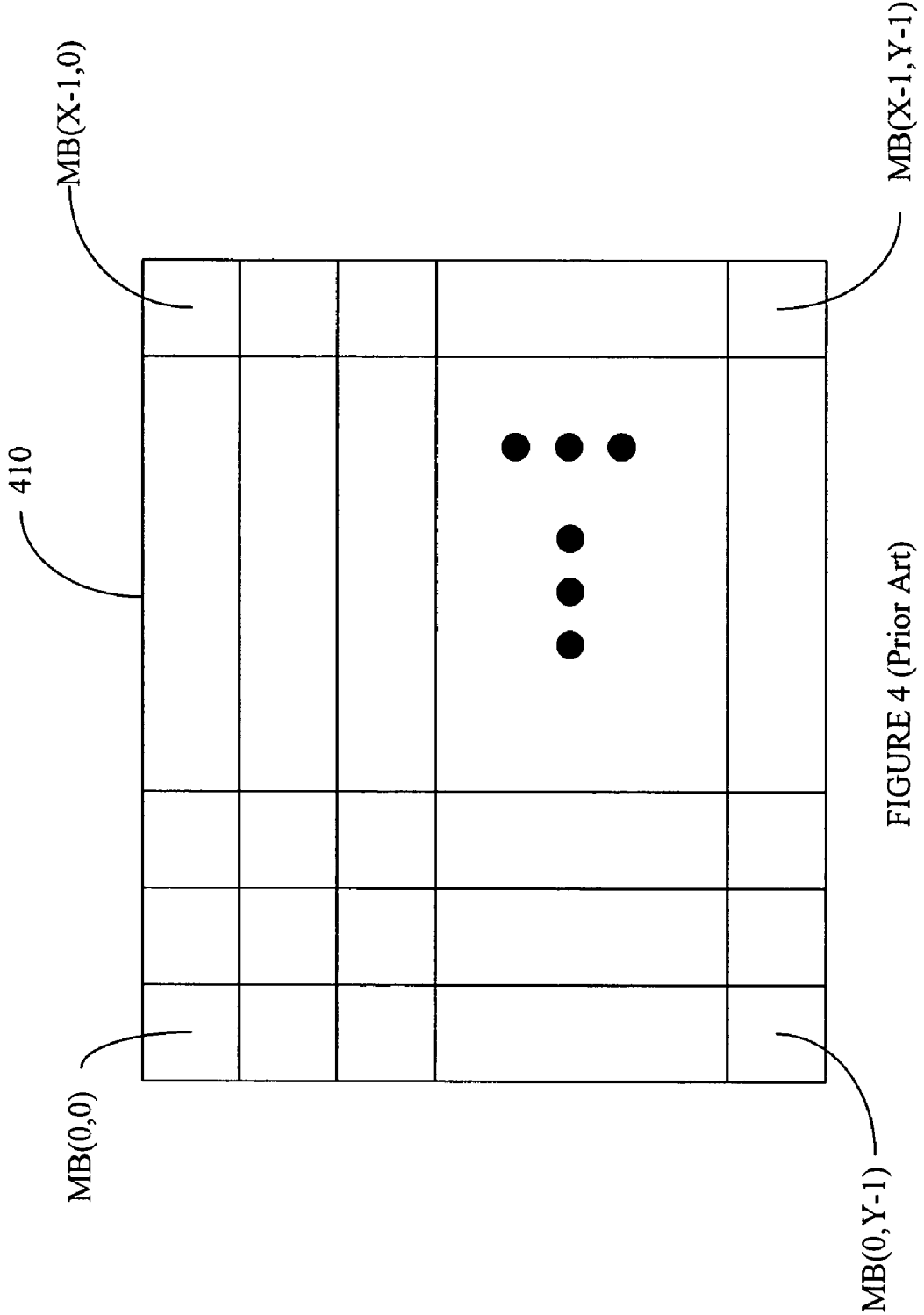
FIG. 4. is a diagram of a digital image divided into macroblocks.
Figure 5B:
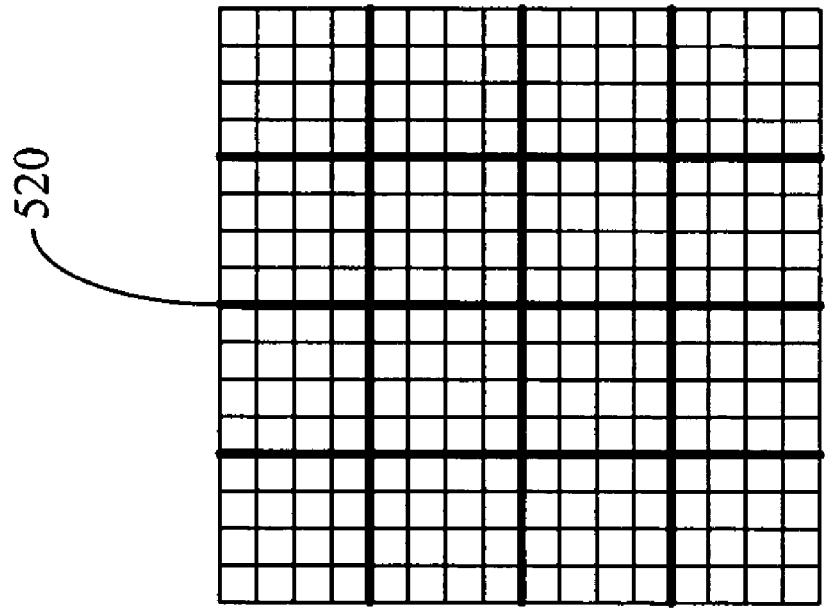
FIGS. 5(a)-5(b) are an illustration of typical macroblocks.
Figure 5A:
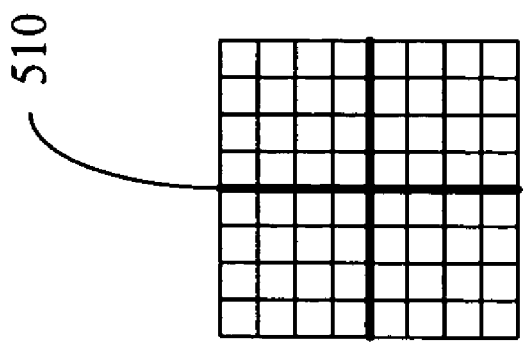
Figure 6:
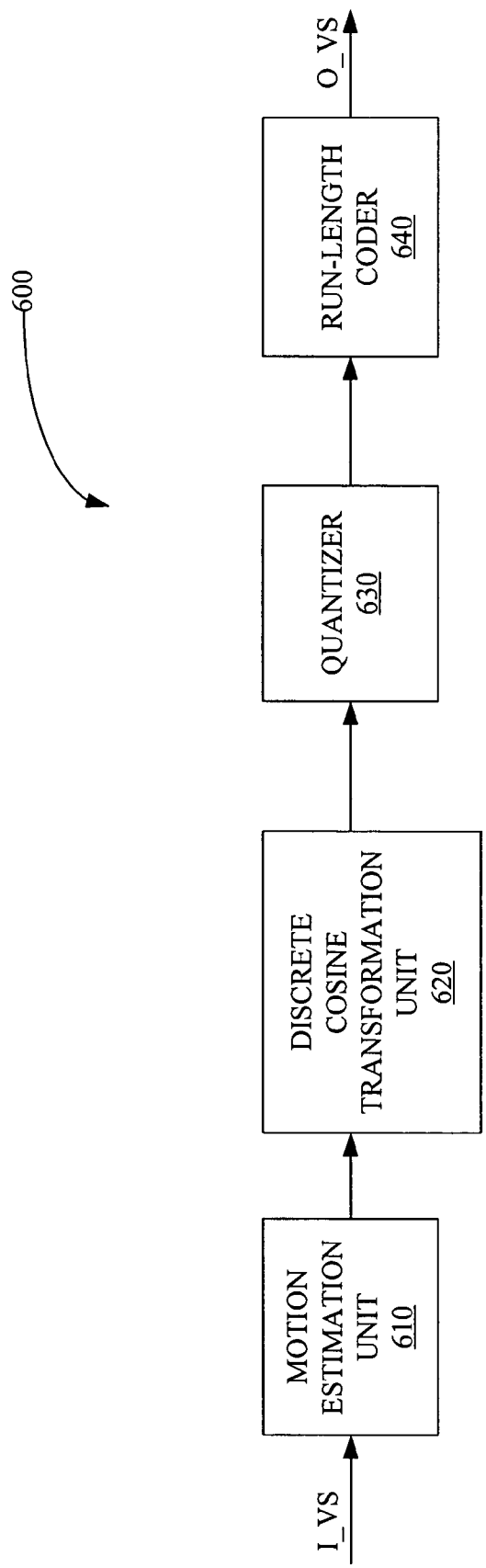
FIG. 6 is a simplified block diagram of a video encoder.
Figure 7:
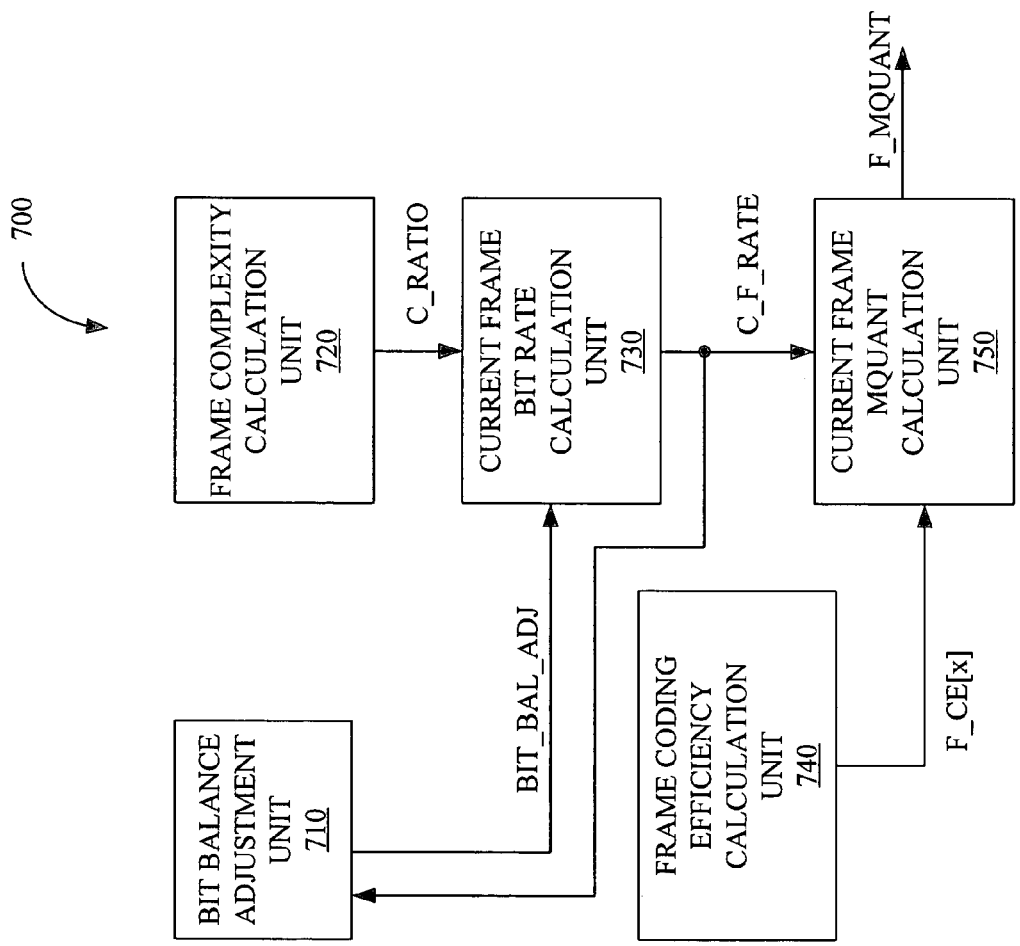
FIG. 7 is a block diagram quantization parameter calculation unit.

FIG. 7 is a block diagram of a frame quantization parameter calculation unit 700. Frame quantization parameter calculation unit 700, which includes a bit balance adjustment unit 710, a current frame complexity calculation unit 720, a current frame bit rate calculation unit 730, a current frame coding efficiency calculation unit 740, and a current frame MQUANT calculation unit 750, calculates frame quantization parameter F_MQUANT for a current frame. Bit balance adjustment unit 710 tracks the number of bits that have been used in previous frames to determine a bit balance adjustment value BIT_BAL_ADJ for the current frame. Frame complexity calculation unit 720 calculates picture complexity for the current frame (i.e. local complexity) as well as tracking the picture complexity of previous frames (i.e. global complexity). Frame complexity calculation unit 720 provides a complexity ratio C_RATIO, which is the ratio of the local complexity to the global complexity, to current frame bit rate calculation unit 730. Current frame bit rate calculation unit 730 uses complexity ratio C_RATIO and bit balance adjustment value BIT_BAL_ADJ to calculate the current frame bit rate C_F_RATE, which is provided to current frame MQUANT calculation unit 750 and bit balance adjustment unit 710. Current frame MQUANT calculation unit 750 converts current frame bit rate C_F_RATE into frame quantization parameter F_MQUANT based on the coding efficiency for each frame type (i.e. intra frame, predicted frame, bi-directional frame), provided by coding efficiency calculation unit 740. Specifically, frame coding efficiency calculation unit provides frame coding efficiency factors F_CE[x] for intra frames, predicted frames and bi-directional frames to current frame MQUANT calculation unit 750.

Figure 8:
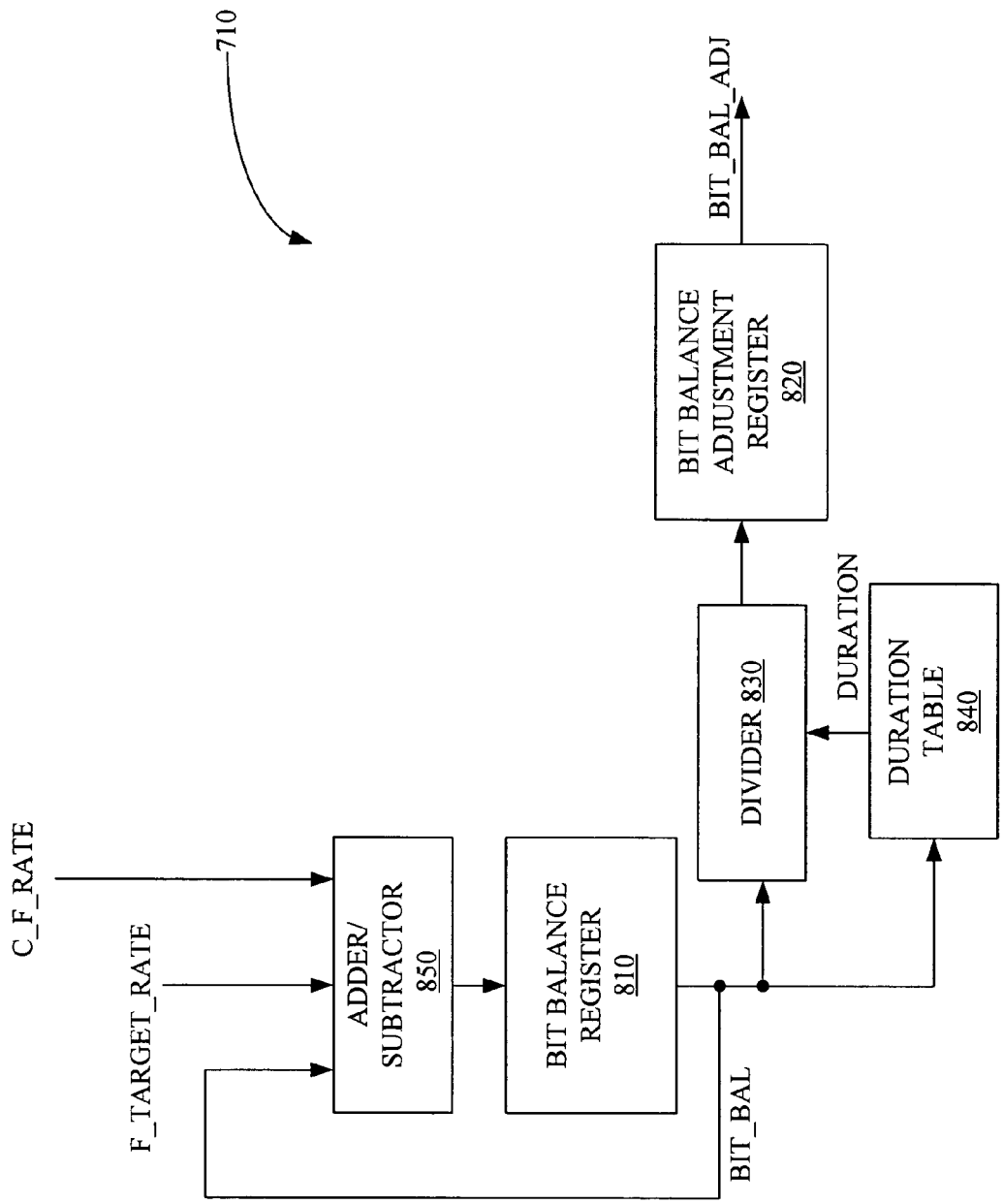
FIG. 8 is a block diagram of a bit balance adjustment unit.

FIG. 8 is a block diagram of one embodiment of bit balance adjustment unit 710, which includes a bit balance register 810, a bit balance adjustment register 820, a divider 830, a duration table 840, and an adder/subtractor 850. Bit balance register 810 stores a bit balance BIT_BAL, which indicates whether the previously processed frames have used more or less bits allotted by the frame target bit rate F_T_RATE. A positive bit balance BIT_BAL indicates that the previously processed frames have on average used less than frame target bit rate F_T_RATE bits per frame. Thus, additional bits may be used to process the current or later frames. Conversely, a negative bit balance BIT_BALL indicates that the previously processed frames have on average used more than frame target bit rate F_TARGET RATE bits per frame. Thus, the current and future frames should use less bits to bring bit balance BIT_BALL back to zero. Bit Balance register 810 is updated after each frame is processed specifically, adder/subtractor 850 adds frame target bit rate F_T_RATE to bit balance BIT_BAL and subtracts a current frame bit rate C_F_RATE (from current frame bit rate calculation unit 730, see FIG. 7), which is equal to the number of bits used to encode the current frame. The result from adder/subtractor 850 is stored in bit balance register 810.

While bit balance BIT_BAL indicates the number of extra bits available or the number of excess bits previously used, bit balance BIT_BAL is typically not restored in a single frame. Bit balance adjustment register 820 provides a bit balance adjustment factor BIT_BAL_ADJ that is used by current frame bit rate calculation unit 730 (FIG. 7). Duration table 840 provides a duration value DURATION to divider 830, which divides bit balance BIT_BAL by duration value DURATION. The quotient from divider 830 is stored in bit balance adjustment register 820. Duration value DURATION depends on bit balance BIT_BAL and the video buffer size. Duration value DURATION corresponds to roughly the number of frames before bit balance BIT_BAL returns to zero. To try and keep bit balance BIG_BAL close to zero, duration value DURATION increases when bit balance BIT_BAL decreases and duration value DURATION decreases when bit balance BIT_BAL increases. In one embodiment of the present invention, duration value DURATION is equal to 512 when bit balance BIT_BAL is less than the video buffer size, is equal to 484 when bit balance BIT_BAL is greater than or equal to the video buffer size and less than two times the video buffer size, and is equal to 256 when bit balance BIT_BAL is greater than or equal to two times the video buffer size.

In general the number of bits required to obtain a given picture quality for a frame is proportional to the complexity of the frame. Frame complexity is intrinsic to the frame itself and is not dependent on the method of encoding. Frame complexity calculation unit 720 (FIG. 7) calculates a local complexity LOCAL_CX, a global complexity GLOBAL_CX, and a complexity ratio C_RATIO, which is equal to local complexity LOCAL_CX divided by global complexity GLOBAL_CX. Frame complexity calculation unit 720 provides the complexity ratio to current frame bit rate calculation unit 730. In one embodiment of the present invention, picture complexities are calculated for intra frames, predicted frames, and bi-directional frames with different constants. Equation EQ1 provides a simple formula for frame complexity F_CX[x] based on an average frame quantization parameter AVG_MQ[x], current frame bit rate C_F_RATE, the macroblock width MB_WIDTH and the macroblock height MB_HEIGHT of the macroblocks used for the frame. The variable "x" can be I for intra frames, P for predicted frames, and B for bi-directional frames.

$$F\_CX[x] = AVG\_MQ[x] * (F\_C\_RATE / (MB\_WIDTH * MB\_HEIGHT)) >$$

As used herein, "G>>H" means to right shift the value G by H bits, which is equivalent to integer division by 2 to the power of H. Average frame quantization parameter AVG_MQ[x] is the average quantization parameter used to process frames of each type. Initially average frame quantization parameter AVG_MQ[x] is initialized to be equal to a quantization parameter constant MQ_C[x] multiplied by macroblock width MB_WIDTH and macroblock height MB_HEIGHT and divided by frame target bit rate F_T_RATE. Equation EQ2 shows symbolically how to calculate average frame quantization parameter AVG_MQ[x].

$$AVG\_MQ[x] = MQ\_C[x] * (MB\_WIDTH * MB\_HEIGHT) / F\_T\_RATE \qquad (EQ2)$$

From empirical evidence and simulation results, quantization parameter constant MQ_C[I] of intra frames should be smaller than quantization parameter constant MQ_C[P] for predicted frames. Quantization parameter constant MQ_C

[B] for bi-directional frames should be larger than quantization parameter constant MQ_C[P] for predicted frames. In a particular embodiment of the present invention quantization parameter constant MQ_C[x] is equal to 500 for intra frames, 500 for predicted frames, and 700 for bi-directional frames.

In one embodiment of the present invention, frame complexity calculation unit 720 calculates a new average local complexity N_A_L_CX, as an intermediary to calculate local complexity LOCAL_CX. New average local complexity N_A_L_CX is equal to a weighted average of the frame complexities weighted by frame types (i.e. intra frames, predicted frames, and bi-directional frames). Specifically, new average local complexity N_A_L_CX is equal to the sum of the number of intra frames in the current group of pictures times the intra frame complexity F_CX[I], the number of predicted frames in the current group of pictures times predicted frame complexity F_CX[P], and the number of bi-directional frames in the current group of pictures times the bi-directional frame complexity F_CX[B] divided by the total number of frames in the current group of pictures. Equation EQ3 shows symbolically how to calculate new average local complexity N_A_L_CX.

$$N\_A\_L\_CX = (N\_I*F\_CX[I] + N\_P*F\_CX[P] + N\_B*F\_CX[B])/N \quad (EQ3)$$

Where the N_I, N_P and N_B is the number of I, P and B frames in the current group of pictures, respectively, and N is the number of frames of the current group of pictures that have been processed. To avoid large fluctuations in local complexity LOCAL_CX, new values of local complexity LOCAL_CX are calculated as a weighted average of the current value of local complexity LOCAL_CX and new average local complexity N_A_L_CX. The initial value of local complexity LOCAL_CX is set equal to initial intra frame complexity F_CX[I]. In a specific embodiment of the present invention, a new value for local complexity LOCAL_CX is equal to new average local complexity N_A_L_CX plus three times the current value of local complexity LOCAL_CX divided by 4. Equation EQ4 shows symbolically how to calculate a new value for local complexity LOCAL_CX.

$$LOCAL\_CX = (N\_A\_L\_CX + 3*LOCAL\_CX)/4 \quad (EQ4)$$

Global complexity GLOBAL_CX is the long term average of local complexity LOCAL_CX. In one embodiment of the present invention, global complexity GLOBAL_CX is updated every 16 frames in the current group of pictures. When global complexity GLOBAL_CX is updated, a new value for global complexity GLOBAL_CX is equal to a global complexity coefficient GGC times local complexity LOCAL_CX plus the current value of global complexity GLOBAL_CX times one minus global complexity coefficient GGC. Equation EQ5 shows symbolically how to calculate a new value for global complexity GLOBAL_CX.

$$GLOBAL\_CX = G\_C*LOCAL\_CX + (1-G\_C)*GLOBAL\_CX \quad (EQ5)$$

Near the beginning of a group of pictures, local complexity LOCAL_CX is more significant to global complexity GLOBAL_CX, therefore global complexity coefficient GCC should be greater for early frames and smaller for later frames in a group of pictures. In one embodiment of the present invention global complexity coefficient is equal to $1/32$ when the number of encoded frames is less than 2000 and is equal to $1/512$ otherwise. The initial value of global complexity GLOBAL_CX is set equal to the initial value local complexity LOCAL_CX. As stated above, complexity ratio C_RATIO is equal to local complexity LOCAL_CX divided by global complexity GLOBAL_CX. Equation EQ6 shows symbolically how to calculate complexity ratio C_RATIO.

$$C\_RATIO = LOCAL\_CX/GLOBAL\_CX \quad (EQ6)$$

Complexity ratio C_RATIO is provided to current frame bit rate calculation unit 730.

Current frame bit rate calculation unit calculates current frame bit rate C_F_RATE to be equal to bit balance adjustment value BIT_BAL_ADJ plus a rate control parameter R_CTRL multiplied by complexity ratio C_RATIO multiplied by frame target rate F_T_RATE plus frame target rate F_T_RATE multiplied by the difference between one and rate control parameter R_CTRL. Equation EQ7 shows symbolically how to calculate current frame bit rate C_F_RATE.

$$C\_F\_RATE = BIT\_BAL\_ADJ + (R\_CTRL * C\_RATIO * F\_T\_RATE) + (F\_T\_RATE * (1 - R\_CTRL)) \quad (EQ3)$$

The value of rate control parameter R_CTRL depends on the number of frames that have been encoded. In general, complexity ratio C_RATIO should have greater impact on current frame rate C_F_RATE at the beginning of encoding a video stream. Therefore rate control parameter R_CTRL should decrease as the number of processed frames increases. In one embodiment of the present invention, rate control parameter R_CTRL is equal to 0.75 when less than 1000 frames have been encoded, is equal to 0.5 when between 1000 and 2000, inclusive, frames have been encoded, and is equal to 0.375 when more than 2000 frames have been encoded. Current frame bit rate C_F_RATE is also limited by frame maximum bit rate F_MAX_RATE and frame minimum bit rate F_MIN_RATE. Thus, if current frame bit rate C_F_RATE is greater than frame maximum bit rate F_MAX_RATE, then current frame bit rate C_F_RATE is set equal to frame maximum bit rate F_MAX_RATE. Conversely, if current frame bit rate C_F_RATE is less than frame minimum bit rate F_MIN_RATE, then current frame bit rate C_F_RATE is set equal to frame minimum bit rate F_MIN_RATE.

The coding efficiency of each frame type must be taken into account to determine frame quantization parameter F_MQUANT from current frame bit rate C_F_RATE. Thus, frame coding efficiency calculation unit 740 calculates frame coding efficiency factor F_CE[x], for each type of frame (i.e., intra frames, predicted frames, and bi-directional frames. In general frame coding efficiency factor F_CE[x] is equal to frame quality constant FQC[x] divided by frame complexity F_CX[x], where x can be I for an intra frame, P for a predicted frame, and B for a bi-directional frame. In general bi-directional frames provide greater coding efficiency than predicted frames, which provide greater coding efficiency than intra frames. Thus, frame quality constant FQC[I] is generally smaller than frame quality FQC[P], which is smaller than frame quality constant FQC[B]. In one embodiment of the present invention, frame quality constant FQC[I] is equal to 56,000; frame quality FQC[P] is equal to 64,000; and frame quality FQC[B] is equal to 70000. In some embodiments of the present invention, dramatic changes to coding efficiency between successive frames are avoided by using a coding efficiency coefficient CEC in the range of 0 to 1, inclusive. A specific embodiment of the present invention uses 0.75 for coding efficiency coefficient CEC. In these embodiments, a new value of frame coding efficiency factor F_CE[x] is equal to one minus coding efficient coefficient CEC times the current value of frame coding efficiency factor F_CE[X] plus coding efficient coefficient times frame quality constant FQC[X] divided by frame complexity F_CX[X]. Equation EQ7 shows symbolically how to calculate frame coding efficiency factor F_CE[x].

$$F\_CE[x] = (1-CEC)*F\_CE[x] + CEC*FQC[x]/F\_CX[x] \qquad (EQ7)$$

Current frame MQUANT calculation unit 750 computes frame quantization parameter F_MQUANT using frame coding efficiency factor F_CE[x] and current frame bit rate C_F_RATE. To adjust for coding efficiency, a bit budget BB[x] is calculated for each frame type, where x can be I for intra frame, P for predicted frame, and B for bi-directional frames. Bit budget BB[x] is the number of bits that should be used for a frame type x. Bit budget BB[x] is equal to a bit budget coefficient BB_C times current frame bit rate C_F_RATE divided by frame coding efficiency factor F_CE[x]. Equation EQ8 shows symbolically how to compute bit budget BB[x].

$$BB[x] = BB\_C*LOCAL\_RATE/F\_CE[x] \qquad (EQ8)$$

Determination of bit budget coefficient BB_C is based on the overall the local bit rates. Specifically, the total number of processed frames (N) in the current group of pictures multiplied by current frame bit rate C_F_RATE should be equal to bit budget BB[I] of intra frames multiplied by the number of intra frames (N_I) plus bit budget BB[P] of predicted frames multiplied by the number of predicted frames (N_P) plus the bit budget BB[B] of bi-directional frames multiplied by the number of bi-directional frames (N_B). This relationship is shown symbolically in equation EQ9.

$$N*C\_F\_RATE = BB[I]*N\_I + BB[P]*N\_P + BB[B]*N\_B \qquad (EQ9)$$

Combining equations EQ8 and EQ9 and solving algebraically for bit budget coefficient BB_C shows that bit budget coefficient BB_C is equal to the number of frames (N) divided by the sum of the number of I frames (N_I) divided by frame coding efficiency factor F_CE[I] plus the number of P frames (N_P) divided frame coding efficiency factor F_CE[P] plus the number of B frames (N_B) divided by frame coding efficiency factor F_CE[B]. Equation EQ10 shows symbolically how to calculate bit budget coefficient BB_C.

$$BB\_C = N/(N\_I/F\_CE[I] + N\_P/F\_CE[P] + N\_B/F\_CE[B]) \qquad (EQ10)$$

By combining equation EQ10 with equation EQ8, bit budget BB[x] is shown to equal the number of Frames (N) multiplied by current frame bit rate C_F_RATE divided by the sum of the number of I frames (N_I) divided by frame coding efficiency factor F_CE[I] plus the number of P frames (N_P) divided frame coding efficiency factor F_CE[P] plus the number of B frames (N_B) divided by frame coding efficiency factor F_CE[B]. Equation EQ11 shows symbolically how to calculate bit budget BB[x].

$$BB[x] = N*C\_F\_RATE/(N\_I/F\_CE[I] + N\_P/F\_CE[P] + N\_B/F\_CE[B])/F\_CE[x] \qquad (EQ11)$$

Bit budget BB[x] may also be modified to avoid decoding issues by the video buffer verifier. In the storage application, such as DVD, the video decoder fetches the encoded bit stream at burst bit rate BURST_RATE. If the decoder video buffer is full, the video decoder simply stops fetching the encoded bit stream automatically. Therefore, the decoder video buffer never overflows. Because video buffer verifier of the encoder models the decoder video buffer, the video buffer verifier need not be overly concerned about buffer overflows. Accordingly, in calculating frame quantization parameter F_MQUANT, video buffer overflows problems are generally not rigorously tested. However, video buffer underflow problems are a major issue that must be prevented. To avoid underflows, a video buffer verifier fullness VBV_FULLNESS is tracked. Specifically video buffer verifier fullness VBV_FULLNESS is initially set equal to the video buffer size VBS. After a frame is processed, video buffer verifier fullness VBV_FULLNESS is updated by adding frame burst rate F_BURST_RATE and subtracting current frame bit usage C_F_BU, which is equal to the actual number of bits used to encode the current frame. To avoid video buffer underflow, bit budget BB[x] should be in the range of 40% of the video buffer size VBS to the video buffer verifier fullness VBV_FULLNESS. Furthermore bit budget BB[x] is also limited by a maximum bit budget limit MAX_BB and a minimum bit budget limit MIN_BB. In one embodiment of the present invention maximum bit budget limit MAX_BB is equal to two times the sum of 60% of video buffer verifier fullness VBV_FULLNESS plus frame target bit rate F_T_RATE and minimum bit budget limit MIN_BB is equal frame target bit rate F_T_RATE divided by four.

To avoid large fluctuation in picture quality, new values for frame quantization parameter F_MQUANT are partially based on previous values of frame quantization parameter F_MQUANT of the same frame type. Specifically in one embodiment of the present invention frame quantization parameter F_MQUANT is equal to one fourth of an average macroblock quantization factor of a previous frame A_MB_MQUANT_PF[x] of the same type as the current frame multiplied by the sum of three plus the previous frame (of the same type) bit usage P_F_BU[x] divided by bit budget BB[x]. As explained in more detail below, frame quantization parameter F_MQUANT can be used for each macroblock of a frame. However many encoders adjust the quantization parameter for each macroblock. Average macroblock quantization factor of a previous frame A_MB_MQUANT_PF[x] is the average of all the macroblock quantization factors used in a frame. Equation EQ12 shows symbolically how to calculate frame quantization parameter F_MQUANT.

$$F\_MQUANT = (A\_MB\_MQUANT\_PF[x]*(3 + P\_F\_BU[x]/BB[x]))/4 \qquad (EQ12)$$

Figure 9:
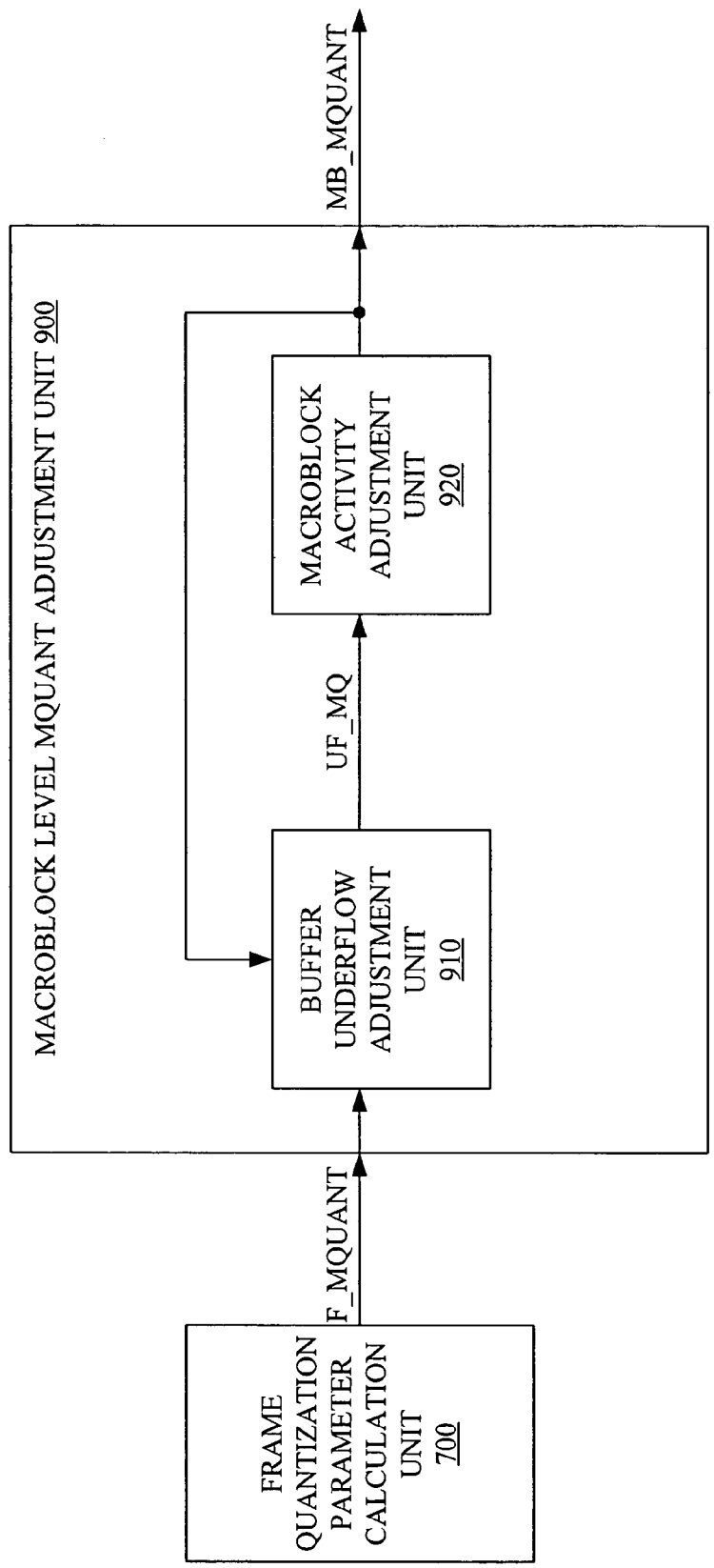
FIG. 9 is a block diagram of a macroblock level MQUANT adjustment unit.

Frame quantization parameter F_MQUANT can be applied to every macroblock of the next frame. However, as illustrated in FIG. 9, some embodiments of the present invention include a macroblock level MQUANT adjustment unit 900 coupled to frame quantization parameter calculation unit 700. Macroblock level MQUANT adjustment unit 900 receives quantization parameter MQUANT and generates a macroblock quantization parameter MB_MQUANT for each macroblock in the frame. The embodiment of Fig. Includes two macroblock level adjustments for the quantization parameter. Specifically, a buffer underflow adjustment unit 910 calculates an underflow adjusted quantization parameter UF_MQUANT for each macroblock and a macroblock activity adjustment unit 920 calculates macroblock quantization parameter MB_MQUANT.

Buffer underflow adjustment unit provides further protection against video buffer underflows. Specifically, as each macroblock is encoded, buffer underflow adjustment unit calculates a new underflow quantization parameter UF_MQUANT for the next macroblock based on the number of bits used to encode the current macroblock. For the first macroblock, underflow quantization parameter is set equal to frame quantization parameter F_MQUANT.

A maximum macroblock bit budget MAX_MB_BB is calculated for the macroblocks of a frame. In one embodiment of the present invention maximum macroblock bit budget MAX_MB_BB is equal to the sum of video buffer verifier fullness VBV_FULLNESS plus 10% of video buffer size VFS divided by the product of macroblock width MB_WIDTH and macroblock height MB_HEIGHT. Equation 13 shows symbolically how to calculate maximum macroblock bit budget MAX_MB_BB.

$$MAX\_MB\_BB=(VBV\_FULLNESS+0.10*VBS)/(MB\_WIDTH*MB\_HEIGHT) \quad (EQ13)$$

The new value for underflow quantization parameter UF_MQ is equal to the current value of underflow quantization parameter UF_MQ multiplied by one plus the sum of total number of bits used so far on the frame TN_BU minus the product of the number of macroblocks processed so far MB_PROC and maximum macroblock bit budget MAX_MB_BB divided by maximum macroblock bit budget MAX_MB_BB. Equation EQ14 shows symbolically how to calculate the new value of underflow quantization parameter UF_MQ.

$$UF\_MQ=UF\_MQ*(1+8*(TN\_BU-MB\_PROC*MB\_MAX\_BB)/MB\_MAX\_BB) \quad (EQ14)$$

Macroblock level MQUANT adjustment unit 900 also includes an optional macroblock activity adjustment unit 920, receives underflow quantization parameter UF_MQ and calculates macroblock quantization parameter MB_MQUANT using conventional activity masking. Activity masking takes advantage of the inability of the human eye's to perceive small changes in areas having strong edges or rapid intensity changes (i.e. areas having a high activity level) to improve compression of macroblocks having a high activity level. Because activity masking is well known in the art, macroblock activity adjustment unit is not described in detail. In the embodiment of FIG. 9, macroblock activity adjustment unit only performs activity masking on intra frames. Generally, macroblock activity adjustment unit calculates an activity level for each macroblock. When the activity level of a macroblock is high relative to the preceding macroblocks, macroblock quantization parameter MB_MQUANT is increased which improves the compression of the macroblock by removing even more high frequency data, which would represent the small changes that would not be perceived by the human eye in the active area. Because the human eye would not perceive the small changes anyhow, removal of the small changes does not result in any perceivable image quality reduction.

In the various embodiments of this invention, novel structures and methods have been described to calculate a quantization parameter for video encoding. By using a complexity ratio to calculate the quantization parameter, complex pictures are encoded with more bits than simple pictures. Thus, the overall picture quality of the encoded video stream is improved. The various embodiments of the structures and methods of this invention that are described above are illustrative only of the principles of this invention and are not intended to limit the scope of the invention to the particular embodiments described. For example, in view of this disclosure, those skilled in the art can define other macro-block formats, intra frame, predicted frames, bi-directional frames, bit balances, complexity measures, complexity ratios, frame bit rates, quantization parameters, coding efficiencies, frame complexities, bit balance adjustment units, frame coding efficiency calculation units, frame complexity calculation units, current frame bit rate calculation units, current frame MQUANT calculation units, duration tables, bit balance adjustment registers, quantization parameter calculation units, buffer underflow adjustment units, macroblock activity adjustment units, encoders, decoders, and so forth, and use these alternative features to create a method or system according to the principles of this invention. Thus, the invention is limited only by the following claims.

What is claimed is:

1. A method of generating a frame quantization parameter for encoding a current frame of an incoming video stream having a plurality of frames, the method comprising:
   calculating a complexity ratio of the current frame, wherein the calculating a complexity ratio of the current frame comprises:
      calculating a local complexity of the current frame; wherein the calculating a local complexity of the current frame comprises:
         calculating a new average local complexity; and
         calculating a new value for the local complexity as a weighted average of a current value of the local complexity and the new average local complexity;
      calculating a global complexity of a plurality of frames; and
      setting the complexity ratio to equal the local complexity divided by the global complexity; complexity ratio of the current frame;
   calculating the frame quantization parameter based on the current frame bit rate.

2. The method of claim 1, wherein the new average local complexity is equal to a weighted average of a plurality of frame complexities weighted by a plurality of frame types.

3. A method of generating a frame quantization parameter for encoding a current frame of an incoming video stream having a plurality of frames, the method comprising:
   calculating a complexity ratio of the current frame, wherein the calculating a complexity ratio of the current frame comprises:
      calculating a local complexity of the current frame;
      calculating a global complexity of a plurality of frames, wherein a new value for global complexity is equal to a global complexity coefficient times the local complexity plus a current value of the global complexity times one minus the global complexity coefficient; and
      setting the complexity ratio to equal the local complexity divided by the global complexity;
   calculating a current frame bit rate using the complexity ratio of the current frame;
   calculating the frame quantization parameter based on the current frame bit rate.

4. A method of generating a frame quantization parameter for encoding a current frame of an incoming video stream having a plurality of frames, the method comprising:
   calculating a complexity ratio of the current frame;
   calculating a current frame bit rate using the complexity ratio of the current frame;
   calculating the frame quantization parameter based on the current frame bit rate; and
   calculating a bit balance adjustment factor that is used in the calculating a current frame bit rate using the complexity ratio, wherein calculating a bit balance adjustment factor comprises:
      tracking a bit balance of a plurality of previously processed frames; and
      dividing the bit balance by a duration to generate the bit balance adjustment factor.

5. A method of generating a frame quantization parameter for encoding a current frame of an incoming video stream having a plurality of frames, the method comprising:
- calculating a complexity ratio of the current frame;
- calculating a current frame bit rate using the complexity ratio of the current frame;
- calculating the frame quantization parameter based on the current frame bit rate; and
- calculating a bit balance adjustment factor that is used in the calculating a current frame bit rate using the complexity ratio, wherein the current frame bit rate is equal to the bit balance adjustment value plus a rate control parameter multiplied by the complexity ratio multiplied by a frame target rate plus the frame target rate multiplied by the difference between one and the rate control parameter.

6. A method of generating a frame quantization parameter for encoding a current frame of an incoming video stream having a plurality of frames, the method comprising:
- calculating a complexity ratio of the current frame;
- calculating a current frame bit rate using the complexity ratio of the current frame;
- calculating a frame coding efficiency factor; and
- calculating the frame quantization parameter based on the current frame bit rate, wherein the calculating the frame quantization parameter based on the current frame bit rate comprises:
  - calculating a bit budget for the current frame using the current frame bit rate;
  - calculating an average macroblock quantization factor of a previous frame, wherein the previous frame and the current frame have a same frame type; and
  - calculating the frame quantization parameter using the bit budget; the average macroblock quantization factor of the previous frame, and a bit usage of the previous frame; and
  - wherein the frame quantization parameter is equal to one fourth of the average macroblock quantization factor multiplied by the sum of three plus the bit usage divided by the bit budget.

7. A method of generating a frame quantization parameter for encoding a current frame of an incoming video stream having a plurality of frames, the method comprising:
- calculating a complexity ratio of the current frame;
- calculating a current frame bit rate using the complexity ratio of the current frame;
- calculating the frame quantization parameter based on the current frame bit rate; and
- calculating an underflow quantization parameter for each macroblock of the current frame; wherein the comprising calculating an underflow quantization parameter for each macroblock of the current frame comprises:
  - calculating a maximum macroblock bit budget;
  - tracking a total bit usage for the current frame;
  - tracking a count of a number of processed macroblocks; and
  - calculating the underflow quantization parameter using the maximum macroblock bit budget, the total bit usage, and the count, wherein a new value of the underflow quantization parameter is equal to a current value of underflow quantization parameter multiplied by one plus the total bit usage minus a product of the count and the maximum macroblock bit budget divided by the maximum macroblock bit budget.

8. The method of claim 7, further comprising applying activity masking to generate a macroblock quantization parameter using the underflow quantization parameter.

9. A method of creating macroblock quantization parameters for a current frame using a frame quantization parameter, the method comprising:
- setting an initial value of the macroblock quantization value to be equal to the frame quantization parameter;
- calculating a maximum macroblock bit budget;
- tracking a total bit usage for the current frame;
- tracking a count of a number of processed macroblocks;
- calculating the underflow quantization parameter using the maximum macroblock bit budget, the total bit usage, and the count, wherein a new value of the underflow quantization parameter is equal to a current value of underflow quantization parameter multiplied by one plus the total bit usage minus a product of the count and the maximum macroblock bit budget divided by the maximum macroblock bit budget.

10. The method of claim 9, further comprising applying activity masking to each macroblock.

11. The method of claim 9, further comprising calculating the frame quantization parameter.

12. The method of claim 11, wherein the calculating the frame quantization parameter comprises:
- calculating a complexity ratio;
- calculating a current frame bit rate using the complexity ratio factor; and
- calculating the frame quantization parameter based on the current frame bit rate.

13. A system for generating a frame quantization parameter for encoding a current frame of an incoming video stream having a plurality of frames, the system comprising:
- means for calculating a complexity ratio of the current frame;
- means for calculating a current frame bit rate, using the complexity ratio of the current frame; and
- means for calculating the frame quantization parameter based on the current frame bit rate; and
- wherein the means for calculating a complexity ratio comprises:
  - means for calculating a local complexity of the current frame;
  - means for calculating a global complexity of a plurality of frames; and
  - means for setting the complexity ratio to equal the local complexity divided by the global complexity; and
  - wherein the means for calculating a local complexity comprises:
    - means for calculating a new average local complexity; and
    - means for calculating a new value for the local complexity as a weighted average of a current value of the local complexity and the new average local complexity.

14. A system for generating a frame quantization parameter for encoding a current frame of an incoming video stream having a plurality of frames, the system comprising:
- means for calculating a complexity ratio of the current frame;
- means for calculating a current frame bit rate using the complexity ratio of the current frame;
- means for calculating the frame quantization parameter based on the current frame bit rate; and
- means for calculating a bit balance adjustment factor that is used by the means for calculating a current frame bit rate using the complexity ratio factor;
- wherein the means for calculating a bit balance adjustment factor comprises:

means for tracking a bit balance of a plurality of previously processed frames;

means for dividing the bit balance by a duration to generate the bit balance adjustment factor.

15. The system of claim 13, further means for comprising calculating a frame coding efficiency factor.

16. The system of claim 15, wherein the means for calculating the frame quantization parameter based on the current frame bit rate comprises:

means for calculating a bit budget for the current frame using the current frame bit rate;

means for calculating an average macroblock quantization factor of a previous frame, wherein the previous frame and the current frame have a same frame type;

means for calculating the frame quantization parameter using the bit budget; the average macroblock quantization factor of the previous frame, and a bit usage of the previous frame.

17. The system of claim 13, further comprising means for calculating an underflow quantization parameter for each macroblock of the current frame.

18. A system for creating macroblock quantization parameters for a current frame using a frame quantization parameter, the system comprising:

means for setting an initial value of the macroblock quantization value to be equal to the frame quantization parameter;

means for calculating a maximum macroblock bit budget;

means for tracking a total bit usage for the current frame;

means for tracking a count of a number of processed macroblocks;

means for calculating the underflow quantization parameter using the maximum macroblock bit budget, the total bit usage, and the count; wherein a new value of the underflow quantization parameter is equal to a current value of underflow quantization parameter multiplied by one plus the total bit usage minus a product of the count and the maximum macroblock bit budget divided by the maximum macroblock bit budget.

19. The method of claim 18, further comprising means for applying activity masking to each macroblock.

20. The system of claim 18, further comprising means for calculating the frame quantization parameter.

21. The system of claim 20, wherein the means for calculating the frame quantization parameter comprises:

means for calculating a complexity ratio;

means for calculating a current frame bit rate using the complexity ratio factor; and means for calculating the frame quantization parameter based on the current frame bit rate.

* * * * *